United States Patent [19]
Quimby et al.

[11] Patent Number: 5,978,903
[45] Date of Patent: Nov. 2, 1999

[54] APPARATUS AND METHOD FOR AUTOMATICALLY ACCESSING A DYNAMIC RAM FOR SYSTEM MANAGEMENT INTERRUPT HANDLING

[75] Inventors: Michael Scott Quimby, Austin; David F. Tobias, Pflugerville, both of Tex.

[73] Assignee: Advanced Micro Devices, Inc., Sunnyvale, Calif.

[21] Appl. No.: 08/914,511

[22] Filed: Aug. 19, 1997

[51] Int. Cl.$^6$ .................................................. G06F 12/08
[52] U.S. Cl. .......................................... 712/229; 711/209
[58] Field of Search ........................... 710/260; 711/203, 711/209; 712/229

[56] References Cited

U.S. PATENT DOCUMENTS

| | | | |
|---|---|---|---|
| 5,459,851 | 10/1995 | Nakajima et al. | 711/149 |
| 5,548,752 | 8/1996 | Lloyd et al. | 711/202 |
| 5,875,451 | 2/1999 | Joseph | 711/105 |

*Primary Examiner*—Jack A. Lane
*Attorney, Agent, or Firm*—Skjerven, Morrill, MacPherson, Franklin & Friel LLP; Ken J. Koestner

[57] ABSTRACT

A System Management Mode is transparent to normal system operations and dynamic RAM (DRAM) is available in the Upper Memory Block address range that is normally not accessible in many configurations. Therefore, the DRAM is advantageously used to attain System Management Mode read/write storage requirements. The System Management Mode time-multiplexes the Upper Memory Block memory-mapped address space with other non-DRAM resources in a timely manner by switching the SMM memory into the DRAM Upper Memory Block space in a "just in time" (JIT) basis. The JIT operation is achieved by latching the first memory address emitted from the CPU after SMM entry. The first memory address is designated as the top address of a memory block that extends downward into memory address space, defining an SMM memory range. All subsequent memory accesses that are addressed within the SMM memory range are directed to DRAM Upper Memory Block regardless of any other memory-mapped resources that normally reside within the same range of addresses as the SMM memory range. Upon the occurrence of an SMM resume instruction, the memory device mapping is automatically restored to the configuration existing prior to SMM activation. Using this technique, memory-mapped address space that is normally used for non-SMM purposes is employed for SMM operations in a method that is transparent to the system and application programs. Advantageously, DRAM that may not be normally available for usage due to the presence of other memory-mapped devices residing in the same address space is made available for SMM operations.

29 Claims, 4 Drawing Sheets

PRIOR ART

APPARATUS AND METHOD FOR AUTOMATICALLY ACCESSING A DYNAMIC RAM FOR SYSTEM MANAGEMENT INTERRUPT HANDLING

BACKGROUND OF THE INVENTION

1. Field of the Invention

The present invention relates to computer systems. More particularly, the present invention relates to a software/hardware interface of a computer system for automatically initiating a predetermined operating mode in response to a signal.

2. Description of the Related Art

Figure 1:
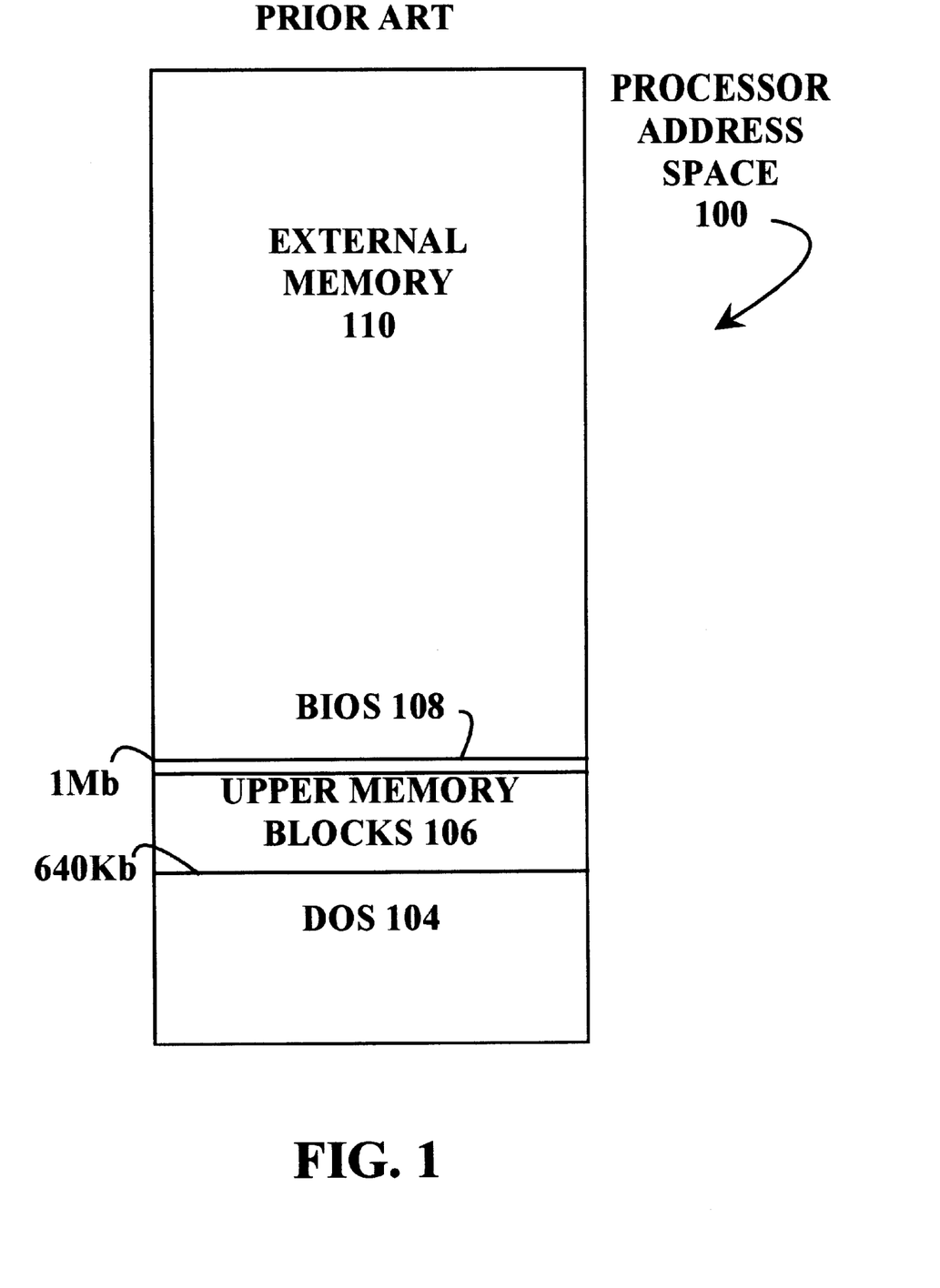
FIG. 1, labeled prior art, is a memory map showing a conventional DOS memory organization.

A processor operating in a PC/AT computer architecture may operate in various functional modes. One mode of operation is an 80×86 real mode in which memory is addressed using a segment value that is multiplied by 16 and added to an offset value to generate a physical memory address. In the real mode no access checks are made to verify that the processor is addressing a correct code, data segment and I/O address space, thereby improving performance but limiting system robustness and security since illegal codes and addresses are not detected by hardware. FIG. 1 illustrates a memory map of a processor address space 100 including a conventional disk operating system (DOS) 104 with a first 640 kbytes that are reserved for the operating system and application programs. Above the first 640 kbytes are stored a video RAM and various optional Basic Input/Output System (BIOS) extensions 108. Extended memory 110 begins above 1 Mbyte and may extend to 4 gigabytes. Memory addresses in the range of A0000h and FFFFFh are commonly referred to as "Upper Memory Blocks" (UMB) 106. The UMB is a highly overused resource when the computer executes in the 80×86 real mode since system memory addressability is limited to 1 MB. For example, various resources that typically reside in the UMB include:

ROM modules which are located on ISA adapter cards

Ethernet transmit/receive buffers

System BIOS in E0000 and F0000 segments

VGA BIOS from C0000–C8000

Flash or ROM Disks in embedded applications, and

DOS extenders which use V8086 mode to page DRAM from above 1 MB into the UMB for use by DOS and applications.

The DOS memory configuration is a relic of the limited memory address space of early generation microprocessors. Subsequent computer systems and architectures have conformed to the memory configuration limitations in varying degrees. Resource conflicts have been common and still frequently occur in attempting to conform architectures with multiple peripheral devices to antiquated memory configurations. Some computer system architectures, for example an ElanSC400 architecture, increase the demand for memory address space in the Upper Memory Blocks by allowing new memory-mapped resources, such as a PCM-CIA (Personal Computer Memory Card International Association) and MMS (Memory Management System) windowing hardware, to be mapped into the Upper Memory Blocks.

System Management Mode (SMM) is a feature of computer systems such as the Enhanced AM486 CPU Core, manufactured by Advanced Micro Devices, Santa Clara, Calif. SMM is often used to support system-level power management. Under certain circumstances, the system's power management driver may shut power off to selected system peripherals. When operating system or application software subsequently performs an I/O access to the powered down device, an SMI may be generated which places the system into SMM. Inside of SMM, the SMI handler can turn the power back on to the required peripheral(s), and reconfigure the peripherals to a pre-powered down state. When SMM is exited, the I/O instruction may be restarted automatically by the CPU and the I/O access will occur transparently as if the power had never been shut off to the peripheral device in the first place. The System Management Mode is typically activated by an external signal to a dedicated terminal that generates an interrupt, specifically a System Management Interrupt (SMI), and redirects execution by directing addressing of executable program code to an SMI handler which resides in SMM RAM. The System Management Mode supports a technique that is application software transparent for taking control of the processor to handle selected system-related events. To achieve a control shift that is transparent to application software, the System Management Mode must save the state of the CPU, handle the SMM event, then restore the CPU state to the condition prior to the SMI. Optimally, the SMM handler should reside in memory (SMRAM) that is not normally accessible to either the operating system (O/S) or any application program. A failure to allocate the SMM handler to restricted memory raises the constraint that the SMRAM address must be known to the O/S or application and usage at the address avoided so that the memory region is not inadvertently allocate to O/S or application usage. The processes of saving and restoring the state of the CPU are performed automatically by the SMM hardware in the CPU upon detection of the SMI event. Both the state save process and the SMM handler code are possible only through a grant of read/write access to the SMRAM region.

Memory regions in the High Memory Area (HMA) above the 1 Mbyte boundary (1 MB+(64K−16)) are discounted for use by devices that compete for UMB space since the DOS kernel is located in the UMB when "dos-high" is specified in config.sys. Accordingly, the upper memory block (UMB) space is valuable and advantageously conserved. Operations utilizing memory regions below 640 kbytes are also prohibited since the memory region from 0 to 640 kbytes is reserved for DOS execution. Accordingly, if real mode execution is sought for a particular function, memory addressing is to be constrained to the memory region between 640 kbyte and the 1 Mbyte boundary. Unfortunately, in a typical computer system many resources are mapped into the Upper Memory Blocks from 640 kbyte to 1 Mbyte region.

What is needed is a circuit and operating method that support shared access for multiple resources in the Upper Memory Blocks region of memory in a range of memory addresses from 640 kbyte to 1 Mbyte.

SUMMARY OF THE INVENTION

In accordance with the present invention, System Management Mode is transparent to normal system operations and dynamic RAM (DRAM) is available in the Upper Memory Block address range that is normally not accessible (i.e. "overlaid" by other memory mapped resources) in many configurations. Therefore, the DRAM is advantageously used to attain System Management Mode read/write storage requirements. The System Management Mode time-multiplexes the Upper Memory Block memory-mapped address space with other non-DRAM resources in a timely manner by switching the SMM DRAM into the Upper Memory Block space on a "just in time" (JIT) basis. The JIT operation is achieved by latching the first memory address emitted from the CPU after SMM entry. The first memory address is designated as the top address of a memory block that extends downward into memory address space for 32 KB, defining an SMM memory range. All subsequent memory accesses that are addressed within the SMM memory range are directed to DRAM regardless of any other memory-mapped resources that normally reside within the same range of addresses as the SMM memory range. Upon the occurrence of an SMM resume instruction, the memory device mapping is automatically restored to the configuration existing prior to SMM activation. Using this technique, memory-mapped address space that is normally used for non-SMM purposes is employed for SMM operations in a method that is transparent to the system and application programs. Advantageously, DRAM that may not be normally available for usage due to the presence of other memory-mapped devices residing in the same address space is made available for SMM operations.

In accordance with an embodiment of the present invention, an Upper Memory Management system increases the utility of available Upper Memory Block memory-mapped address space and allows DRAM (dynamic random access memory) resources to be used efficiently. In a conventional computer system, the DRAM resources which are located at the same addresses as other memory-mapped devices are normally wasted.

Many advantages are achieved by the described circuit and operating method. One advantage is that computer system performance is improved by supporting real mode operation of system management operating system functions. The illustrative method and apparatus advantageously performs automatic and real time device target multiplexing of the UMB address space between 1) memory mapped resources and 2) the usually non-accessed DRAM which resides at the same memory addresses as the memory mapped resources from 1) to provide a protected area for the SMM state save area and SMI handler during SMM. SMM accesses are directed to the same physical DRAM devices as normal non-SMM accesses, advantageously utilizing real-time target device switching that is supported by the ElanSC400 architecture. Further advantageously, the illustrative SMI handling system attains a reduced system cost without reduction in security of the SMRAM address space.

BRIEF DESCRIPTION OF THE DRAWINGS

The features of the described embodiments believed to be novel are specifically set forth in the appended claims. However, embodiments of the invention relating to both structure and method of operation, may best be understood by referring to the following description and accompanying drawings.

DETAILED DESCRIPTION OF THE PREFERRED EMBODIMENTS

Figure 2:
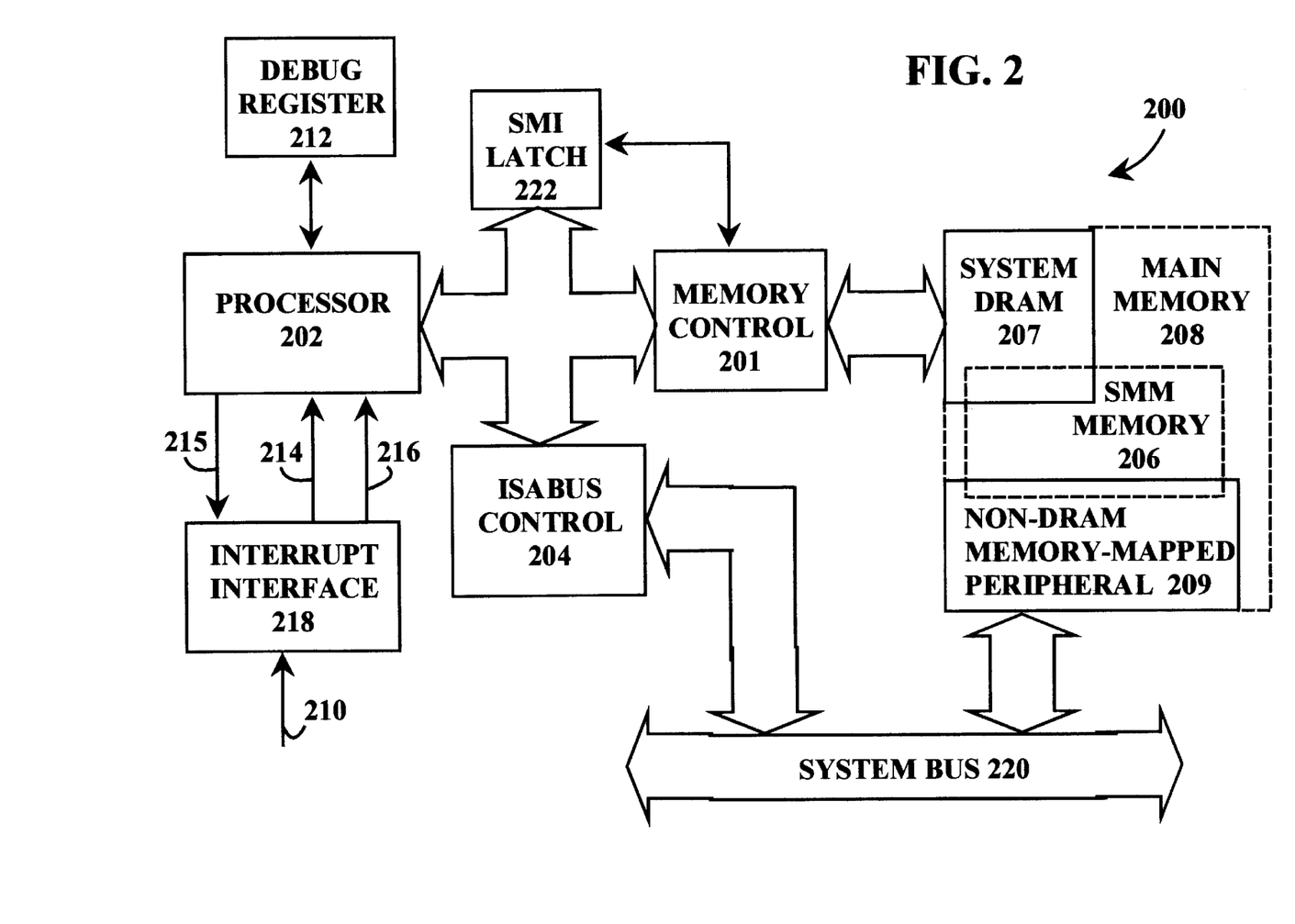
FIG. 2 depicts a schematic block diagram illustrating an embodiment of a computer system that implements an apparatus for automatically accessing DRAM for processor state storage in response to a system management interrupt (SMI).

Referring to FIG. 2, a schematic block diagram illustrates an embodiment of a computer system 200 that implements an apparatus for automatically accessing DRAM for processor state storage in response to a system management interrupt (SMI). A System Management Mode (SMM) is an operating mode of a processor which is distinct from real, virtual and protected modes on the basis of distinct features in both circuits and operating software. The system management mode (SMM) allows a system designer to add software-controlled features to particular computer system versions that operate transparent to the operating system and software applications. The system management mode (SMM) is intended for usage only by system firmware and not by application software or general purpose system software. A computer system interrupts normal program execution and invokes system management mode (SMM) by generating a System Management Interrupt (SMI) to a processor 202. The processor 202 then services the system management interrupt (SMI) by executing an SMI handler sequence of instructions.

The computer system 200 includes the processor 202, a system memory including a main memory 208, an interrupt interface 218 and a system bus controller 204. To best illustrate the advantages of the described memory system, the main memory 208 includes a system DRAM 207 and a non-DRAM memory-mapped peripheral 209. In various systems, the main memory 208 is implemented in system DRAM 207 for common on desktop computer systems, or in static RAM (SRAM) for typical embedded system embodiments. A particular system is specified according to memory parameters including: (1) the general memory-mapped address space, (2) the memory address space that generates DRAM accesses, and (3) the memory address space that generates other, non-DRAM accesses such as ISA bus transactions. The general memory-mapped address space typically refers to the total address space (4 GB) that the processor accesses during a memory cycle. A memory cycle is defined by the processor opcode that generates the cycle and by the external processor signals that are used to perform the memory cycle. Memory cycles are directed to one of several different physical targets in the computer system 200. Typical targets include the system DRAM 207 or an external bus such as ISA, VL, or PCMCIA buses. If a DRAM controller in the memory control circuit 201 decodes the address generated by the processor 202 as an address "hit" in any enabled DRAM region, the memory cycle is directed to a multiplexed (typically RAS then CAS signal) DRAM bus. If the DRAM controller does not utilize the address as a DRAM cycle, in a typical system the cycle may be next directed to the ISA bus. In the illustrative embodiment, an SMM memory 206 is selectively implemented in either the system DRAM 207 or a non-DRAM memory-mapped peripheral 209 on an expansion bus such as an ISA bus. The location of implementation of the SMM memory 206 is system dependent. In one example, the ElanSC400 architecture, the target is always the system DRAM 207.

The processor 202 is connected to peripherals including the main memory 208, the system DRAM 207, and the interrupt interface 218 by a system bus 220. The processor 202 asserts that system management mode is active by asserting a SMIACT signal on a SMIACT line 215. The interrupt interface 218 is connected to two signals for interfacing to memory devices that are different from typical memory devices. These signals include a system management interrupt address SMIADS signal on an SMIADS line 214 and a system management interrupt ready SMIRDY signal on an SMIRDY line 216. Memory accesses are normally performed using the normal processor address strobe and ready handshake signals that would be connected to main memory. For the illustrative computer system 200 that uses the SMIADS signal and the SMIRDY signal, upon active assertion of the SMM mode the special SMIADS and SMIRDY signals are used instead of the CPU address strobe and handshake signals so that a completely separate memory device is used for the SMM save state area and for holding the SMI handler. Usage of the SMIADS and SMIRDY signals extracts a system cost since a completely different (minimum 32 KB) memory device is added to the system. The SMIADS signal and the SMIRDY signal are "ORed" with the normal handshake lines and feed an output signal to the DRAM controller. Accordingly SMM accesses are directed to the same physical DRAM devices as normal non-SMM accesses, advantageously utilizing real-time target device switching that is supported by the ElanSC400 architecture. Further advantageously, the illustrative SMI handling system attains a reduced system cost without reduction in security of the SMRAM address space.

The interrupt interface 218 is also connected to an SMI latch 222 for latching an SMI execution address that is the first address generated by the processor 202 following entry to the system management mode.

In the illustrative embodiment, the interrupt interface 218 is an ElanSC400 architecture interface for generating predetermined interrupt signals in response to signals generated by external events. In the illustrative embodiment, the processor 202 is an Enhanced AM486 CPU core which is manufactured by Advanced Micro Devices of Santa Clara, Calif. The illustrative system bus 220 is an Industry Standard Architecture (ISA) or Extended Industry Standard Architecture (EISA) bus that define a bus structure, CPU architecture, interface and bus support circuits and clock frequency. The Enhanced AM486 CPU core includes a Basic Input/Output System (BIOS) executable program code for handling system management interrupts having a state save memory area and a SMM handler code that are located in a memory by programmable addresses. The Enhanced AM486 CPU core further provides that the SMM memory 206 may be programmably located in a physical storage device that is separate from the main memory 208 and the system DRAM 207. However, the ElanSC400 interrupt interface 218 specifies that the state save memory area and the SMM handler code be located in the system DRAM 207. In the ElanSC400 environment, the state save and handler areas are commonly mapped in addresses below 1 Mbyte to support real mode systems and systems that have less than 1 Mbyte of DRAM.

Memory regions in the High Memory Area (HMA) above the 1 Mbyte boundary (1 MB+(64K−16)) are allocated for use by devices that compete for UMB space since the DOS kernel is located in the UMB when "dos-high" is specified in config.sys. Accordingly, the upper memory block (UMB) space is valuable and advantageously conserved. Operations utilizing memory regions below 640 kbytes are also prohibited since the memory region from 0 to 640 kbytes is reserved for DOS execution. Accordingly, if real mode execution is sought for a particular function, memory addressing is to be constrained to the memory region between 640 kbyte and the 1 Mbyte boundary. Unfortunately, in a typical computer system many resources are mapped into the Upper Memory Blocks from 640 kbyte to 1 Mbyte region. For example, in the illustrative embodiment the interrupt interface 218 maps the memory management system (MMS) windows into the Upper Memory Blocks. The system management interrupt (SMI) handler and a state-save operation for saving the operating state of the processor 202 at the occurrence of a SMI are operating system functions that are frequently invoked so that the efficiencies of real mode operation are highly advantageous for improving computer system performance. The SMI state-save operation and SMI handler are operations that use memory resources in the system DRAM 207 located at the low order addresses "behind" the Upper Memory Blocks. The MMS windows are resources that are to be held available at all times while maintaining accessibility to system DRAM 207 located at the same low order addresses "behind" the Upper Memory Blocks for the SMI state-save operation and SMI handler. In addition, the transition between the SMI functions and the MMS windows is to be performed automatically, without handling the transition with resort to execution of instructions by the processor.

In the illustrative embodiment, the SMM DRAM is to be located in the Upper Memory Block area from A0000h to FFFFFh to maximize the amount of dynamic RAM of system DRAM 207 from locations 00h to 640 Kbyte that is available to the computer system 200, and to avoid dynamic RAM conflicts with DOS programs. On most ISA systems, memory-mapped accesses to the Upper Memory Block addresses are directed to the ISA bus so that the system DRAM 207 cannot possibly be accessed directly for the purpose of storing the SMM state save information and executing the SMM handler since all protective mode features such as paging are disabled upon SMM entry. On the ElanSC400, the lack of available address space in the Upper Memory Blocks is further diminished since the ElanSC400 incorporates hardware to support MMS windows or other memory-mapped resources that can be mapped into the Upper Memory Blocks.

The System Management Mode is implemented to control power consumption independently of the operating mode and the operating environment. The processor 202 includes interrupt interface 218 that recognizes a system management interrupt (SMI) that has a highest priority that is even higher than the priority of a nonmaskable interrupt (NMI). The processor 202 addresses a special System Management Mode (SMM) memory 206 region of the main memory 208. The SMM memory 206 has an address space of 1 Mbyte is reserved for usage by the processor 202 during operations in the System Management Mode. In the illustrative embodiment, the SMM memory 206 is constrained to a system dynamic random access memory (DRAM) 207. The SMI is issued by a signal with a low level on an SMI pin 210 or by setting a predefined bit in a debug register 212 and executing an opcode F1h. In either case, the processor 202 issues a system management interrupt which changes the operating state of the processor 202 to a pseudo-real mode prior to execution of an SMI hander and stores the current operating state of the processor 202 at an address reserved for a state save (illustratively SMBASE+8000h+7FFFh). The processor 202 eventually returns to the pseudo-real mode and begins execution of an SMI handler at a defined address SMBASE+8000h in the SMM memory 206. When a state save to the designated state save address (for example SMBASE+8000h+7FFFh) is complete, the processor 202 redirects the execution address and begins executing the executable code currently residing at the SMI handler address (illustratively SMBASE+8000h). The first address evoked by the processor 202 following an SMI interrupt event is latched in the SMI latch 222 so that the defined SMI handler address is redirected to the latched address. Addresses that otherwise would be directed to the system bus 220 or the upper memory blocks are instead directed to the system DRAM 207. The processor 202 acknowledges that execution is in the System Management Mode by asserting the SMIACT signal. Other I/O access instructions such as IN or OUT remain directed to the normal I/O address space.

Upon execution of the resume instruction (0Fh AAh), the SMM logic of the processor 202 restores the pre-SMM processor state from the SMM state save area, and then returns control to the routine which was interrupted by the SMI.

The system DRAM 207 thus becomes automatically accessible by the SMI state-save operation and SMI handler by shifting memory access to the system DRAM 207 immediately upon the event of a system management interrupt (SMI) no matter what other resources are normally accessible in the Upper Memory Blocks. The system DRAM 207 immediately becomes the default target for memory cycles directed to the Upper Memory Blocks in the memory region which has been defined as SMRAM.

Operating memory for the computer system 200 is the main memory 208 which illustratively includes a system DRAM 207 and a non-DRAM memory-mapped peripheral 209. The non-DRAM memory-mapped peripheral 209 is accessed by the processor 202 via the system bus 220. The system DRAM 207 is accessed by the processor 202 through a DRAM controller (not shown) in the memory control circuit 201. The processor 202 accesses the system DRAM 207 via the DRAM controller since the DRAM memory address is multiplexed to generate a row address followed by a column address. The processor 202 address is not multiplexed.

Memory addresses in the range from 0h to 640 kbyte are accessed in the system DRAM 207. Memory addresses in the range above 1 Mbyte are also access in the system DRAM 207. Memory addresses in the upper memory block range above 640 kbyte but below 1 Mbyte are directed to the ISA bus via the system bus 220. However, during the system management mode (SMM) operations the illustrative memory system redirects memory addressing so that addresses in the upper memory blocks are directed to the system DRAM 207. The system management interrupt (SMI) initiates the redirection from memory addresses in the upper memory blocks to the system DRAM 207 so that the first address generated by the processor 202 is latched by the SMI latch 222 to set the top address of the SMM memory 206. The system management state is saved by writing the state parameters and variables to the SMM memory 206 beginning at the first address with the address decrementing for each stored element. The illustrative method and apparatus advantageously achieves redirection of SMM memory accesses from the main memory 208 via the system bus 220 to the system DRAM 207 by direct access. This redirection is advantageously achieved in real-time and automatically to actively multiplex the upper memory block address space to support the system management mode.

Figure 3:
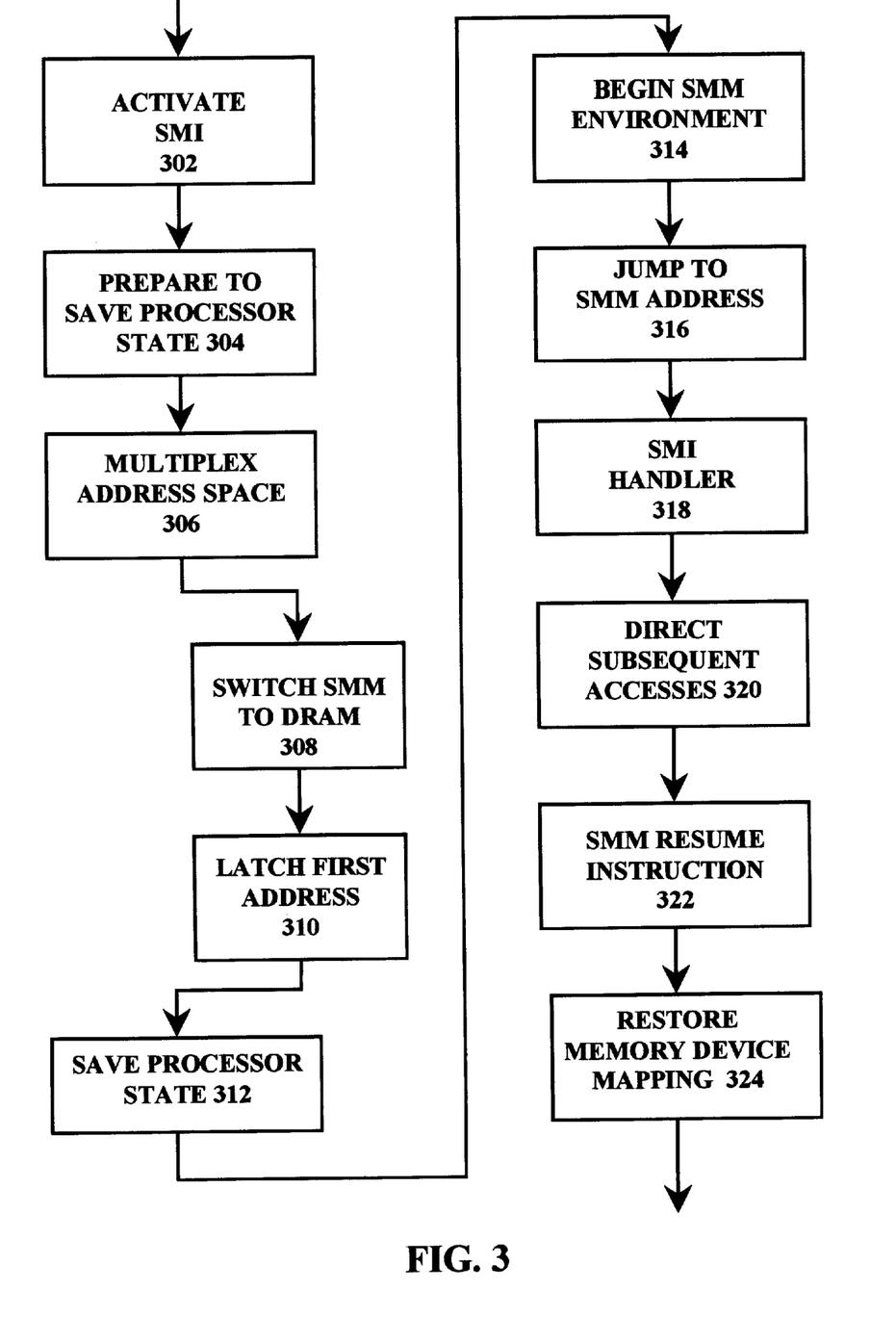
FIG. 3 is a flow chart illustrating steps of a method for configuring and accessing state save storage and supplying a handler routine in memory for system management interrupt (SMI) operations.

Referring to FIG. 3 in conjunction with FIG. 2, a flow chart illustrates steps of a method 300 for configuring and accessing state save storage and supplying a handler routine in memory for system management interrupt (SMI) operations. System Management Mode is transparent to normal system operations. In addition, the system DRAM 207 is available in an Upper Memory Block address range that is normally not accessible in many configurations. The described operating method 300 exploits these conditions by using the system DRAM 207 to achieve a specified System Management Mode read/write storage performance. First, the processor 202 asserts the SMIACT signal on the SMI-ACT line 215 in response to external logic asserting the SMI signal. The SMI signal asserts the system management interrupt (SMI) and enters the system management mode (SMM) in step 302. The SMIACT signal informs external devices that the computer system 200 is operating in the SMM mode. In the ElanCS400 architecture that interfaces to the AM486 core uses the SMIACT signal as to trigger indicating when to latch a next memory address from which the 32 KB SMRAM grows downward. The processor 202 then prepares to save the current processor state 304 in a multiple-step procedure. In a multiplex UMB address space to DRAM step 306, the System Management Mode time-multiplexes the Upper Memory Block memory-mapped address space with other non-DRAM resources in a timely manner by switching the SMM memory into the DRAM Upper Memory Block space 308 in a "just in time" (JIT) basis. The JIT operation is achieved in a latch first address step 310 by latching the first memory address emitted from the CPU after SMM entry in SMI latch 222, thereby recognizing that the interrupt is a system management interrupt (SMI) and evoking the system management mode (SMM) by initiating an SMI state-save. The SMI latch 222 automatically latches the first address generated by the processor 202 of the SMM save-state write cycle upon detecting that the system management mode (SMM) is active. The first memory address designates the top address of a memory block of a predetermined size, for example 32 Kbyte, that extends a predetermined direction, for example downward, into memory address space. The first address defines the top of the 32-Kbyte memory block starting from the latched address and extending downward in the system memory space. If any part of the 32-Kbyte region is located in the address space of the processor 202 defined as the upper memory blocks or "upper memory area" from 640-Kbyte to 1-Mbyte or in the "high memory area" from 1-Mbyte to 64-Kbyte above 1-Mbyte, then all processor 202 memory accesses, excluding DMA accesses, to the aforementioned 32 kb SMM memory region in the SMM mode are directed to the system DRAM 207. The memory accesses are diverted automatically to ensure that the SMM state-save operation can be written to system memory, the system DRAM 207, without interruption. The state-save operation of the processor 202 is an automatic sequence of memory write operations performed by the processor 202. When the system management interrupt (SMI) is detected by the processor 202, the system firmware does not have a sufficient opportunity to reconfigure the memory configurations, including enabling of a DRAM memory area in the upper or high memory areas.

If the "latched" memory region that is detected upon entering SMM is not located in the upper or high memory area, the processor cycles are directed to the appropriate memory space as in the normal operation mode.

In the system management mode (SMM), the processor 202 has access to any address within a full 64-Mbytes of the system DRAM 207 space. To guarantee full memory access, the interrupt interface 218 deasserts the A20M signal of the processor 202 before entry into the system management mode (SMM). The A20M signal is restored to the pre-SMM state upon exit from the system management mode (SMM), assuming that the pre-SMM state was not modified by the firmware during the SMM routine.

Thus the first memory address defines an SMM memory range and the system begins saving the processor state 312, also called a processor context, in the manner of a stack save, starting at the top of the SMM memory 206 and moving downward through memory addresses of the system DRAM 207. In the save processor state step 312, the processor 202 writes the internal register contents of the processor 202 to the SMM memory 206 starting at the address location SMBASE+8000h+7FFFh and proceed downward in memory in a stack-like fashion.

The processor 202 switches to the system management mode (SMM) processor environment in step 314. In step 316 the execution path of the processor 202 jumps to the absolute address of SMBASE+8000h in the SMM memory 206 to execute the SMI handler 318. The SMI handler 318 performs system management operations.

All subsequent memory accesses 320 that are addressed within the SMM memory range are directed to the Upper Memory Block of the system DRAM 207 regardless of any other memory-mapped resources that normally reside within the same range of addresses as the SMM memory range. Upon the occurrence of an SMM resume instruction 322, the memory device mapping is automatically restored 324 to the configuration existing prior to SMM activation, returning to a normal operating mode and making accessible the normal resource allocations to the upper memory blocks. Using this technique, memory-mapped address space that is normally used for non-SMM purposes is employed for SMM operations in a method that is transparent to the system and application programs. Advantageously, DRAM that is not normally available for usage due to the presence of other memory-mapped devices residing in the same address space is made available for SMM operations.

Figure 4:
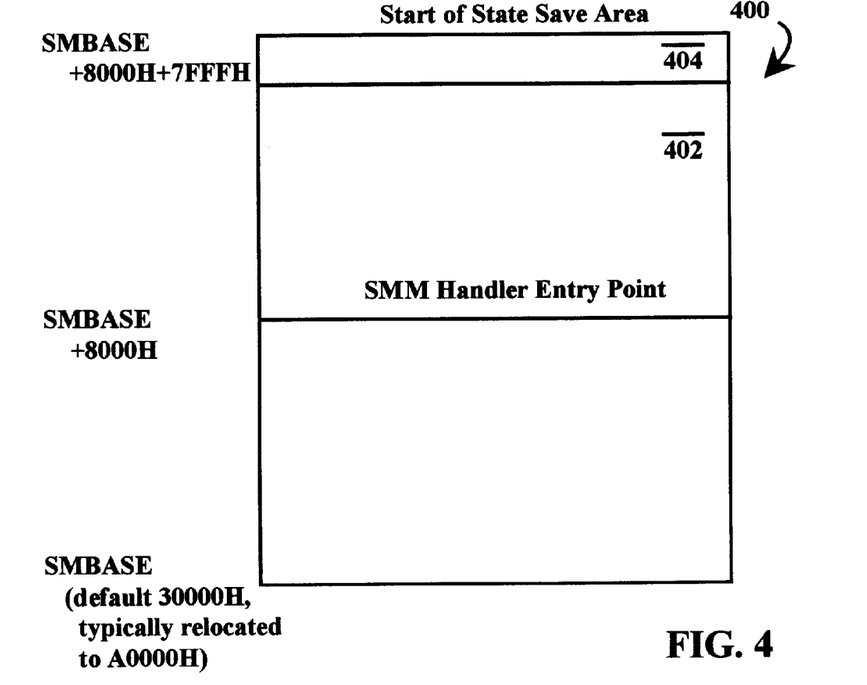
FIG. 4 is a memory map illustrating an SMM memory organization for implementing an embodiment of the method and apparatus for automatically accessing DRAM for processor state storage in response to a system management interrupt (SMI).

Referring to FIG. 4, a memory map illustrates the address space of the SMM memory 206. The system management mode (SMM) utilizes a physical memory space 400 to store an SMM handler code 402 and a processor state or context save area 404. The entire memory space 400 is called the SMM memory 206. In the illustrative embodiment, SMM memory 206 is located in a part of the physical system memory space or system DRAM 207. In the illustrative computer system 200, the SMBASE defaults to an address of 30000h since 30000h is located in system DRAM 207. DRAM is swapped in real time in locations where DRAM is normally not the physical target. In the exemplary embodiment, DRAM is relocated to address A0000h. A0000h is often used as the SMBASE address for ElanSC400 architecture systems since the DRAM controller of the memory control circuit 201 normally does not respond to addresses in the A0000h to AFFFFh range in a typical PC/AT compatible system. In the PC/AT compatible system the A0000h to AFFFFh locations are used by an ISA-based VGA card to decode part of a memory-mapped frame buffer. Accordingly, in the typical PC/AT compatible system access of addresses A8000h to AFFFFh results in generation of ISA cycles to the VGA card. With SMMBASE directed to A0000h on the illustrative system, memory cycles are advantageously redirected to the otherwise wasted DRAM which resides at addresses A8000h to AFFFFh.

Figure 5:
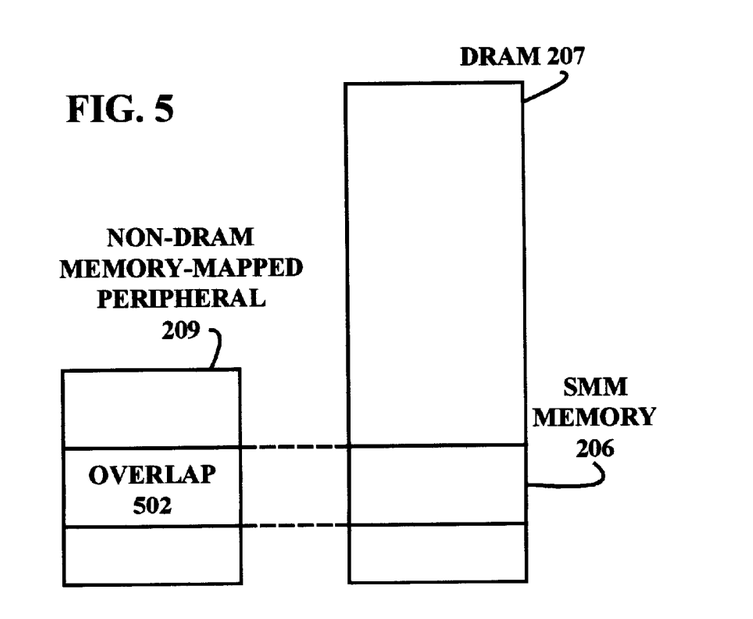
FIG. 5 is a memory map which illustrates a system memory and a dynamic RAM (DRAM) memory according to an embodiment of the method and apparatus for automatically accessing DRAM for processor state storage in response to a system management interrupt (SMI).

Referring to FIG. 5, a memory map illustrates that the SMM memory 206 is "overlaid" with the system DRAM 207. The SMM memory 206 can be relocated to any system memory address location by modifying an SMBASE control register of the processor 202. The SMBASE register is set to a default value of 30000h upon reset of the processor 202. The default SMM memory 206 area is 32-Kbytes, located from 38000h to 3FFFFh.

Any system DRAM 207 that is located at the same address as an "ISA overlap window" 502 becomes "invisible" or inaccessible to the computer system 200 unless the address is accessed through the MMS, is shadowed ROM, or is configured as graphics controller memory.

The disclosed method for initiating and terminating the system management mode (SMM) advantageously is automatic and transparent to a system user. The disclosed method and apparatus is further advantageous for achieving double usage of two scarce resources, the processor address space and the upper memory block address space.

While the invention has been described with reference to various embodiments, it will be understood that these embodiments are illustrative and that the scope of the invention is not limited to them. Many variations, modifications, additions and improvements of the embodiments described are possible. The invention is defined by the appended claims in light of their full scope of equivalents. For example, the illustrative apparatus and method are depicted as a particular processor and interface circuit. The invention is applicable to all suitable processors including all 80×86 type processors and other non-80×86 processors. Similarly, the invention is applicable not only to microprocessors but also to various other types of central processing units (CPUs) including processors for larger computers including workstations, mainframes and supercomputers.

What is claimed is:

1. A method of multiplexing a memory address space in a computer system including a processor, the method comprising the steps of:

configuring a memory to include a first memory address space and a second memory address space, the first memory address space being accessed when the processor is operating in a normal mode and the second memory address space being a special mode memory range accessed when the processor is operating in a special mode;

operating in the normal mode;

directing memory accesses to the first memory address space while operating in the normal mode;

receiving a signal designating a request to operate the processor in the special mode;

initiating processor operations in the special mode;

time-multiplexing the second memory address space with the first memory address space during operations in the special mode; and directing subsequent memory accesses within the special mode memory range to the second memory address space so that the first memory address space and the second memory address space overlap.

2. A method according to claim 1 wherein the step of time-multiplexing the second memory address space with the first memory address space further comprises the steps of:

latching the first memory address emitted from the processor after initiation of the special mode; and designating the first memory address emitted from the processor after SMM entry as the top special mode address of a memory block extending into the special mode memory range.

3. A method according to claim 1 further comprising the steps of:
 receiving a signal designating a request to terminate operations of the processor in the special mode; and
 restoring an operating memory configuration to direct memory accesses to the first memory address space.

4. A method according to claim 1 wherein the step of directing subsequent memory accesses within the special mode memory range to the second memory address space directs the memory accesses regardless of whether other memory-mapped resources reside within the same range of addresses as the special mode memory range.

5. A method according to claim 1 wherein the special mode memory range is allocated to the upper memory block addresses of a DOS memory configuration.

6. A method according to claim 1 wherein the special mode is a system management mode.

7. A computer program product comprising:
 a computer usable medium having computable readable code embodied therein implementing a method according to claim 1.

8. A computer system comprising:
 a processor;
 a memory coupled to the processor, the memory supplying data and executable program code including a computable readable code embodied therein implementing a method according to claim 1.

9. A method of multiplexing a memory address space in a computer system including a processor, the method comprising the steps of:
 configuring a memory to include a first memory address space and a second memory address space, the first memory address space and the second memory address space being nonoverlapping, the first memory address space being accessed when the processor is operating in a normal mode and the second memory address space being accessed when the processor is operating in a special mode;
 directing memory accesses to the first memory address space;
 receiving a signal designating a request to operate the processor in the special mode;
 initiating processor operations in the special mode;
 latching the first memory address emitted from the processor after initiation of the special mode;
 designating the first memory address emitted from the processor as the top special mode address of a memory block extending into a special mode memory range;
 directing subsequent memory accesses within the special mode memory range to the second memory address space so that the first memory address space and the second memory address space overlap.

10. A method according to claim 9 further comprising the steps of:
 receiving a signal designating a request to terminate operations of the processor in the special mode; and
 restoring an operating memory configuration to direct memory accesses to the first memory address space.

11. A method according to claim 9 wherein the step of directing subsequent memory accesses within the special mode memory range to the second memory address space directs the memory accesses regardless of whether other memory-mapped resources reside within the same range of addresses as the special mode memory range.

12. A method according to claim 9 wherein the special mode memory range is allocated to the upper memory block addresses of a DOS memory configuration.

13. A method according to claim 9 wherein the special mode is a system management mode.

14. A computer program product comprising:
 a computer usable medium having computable readable code embodied therein implementing a method according to claim 9.

15. A computer system comprising:
 a processor;
 a memory coupled to the processor, the memory supplying data and executable program code including a computable readable code embodied therein implementing a method according to claim 9.

16. A method of multiplexing a memory address space in a computer system including a processor, the method comprising the steps of:
 configuring a memory to include a first memory address space and a second memory address space, the first memory address space having a memory range in an upper memory blocks region of a DOS operating system and the first memory address space being accessed when the processor is operating in a normal mode, and the second memory address space having a system management mode (SMM) memory range in an upper memory blocks region of a DOS operating system and the second memory address space being accessed when the processor is operating in a system management mode (SMM), the system management mode conforming to an 80×86 real operating mode;
 operating in the normal mode, the normal mode conforming to the 80×86 real operating mode;
 directing memory accesses to the first memory address space while operating in the normal mode;
 receiving a signal designating a request to operate the processor in the system management mode (SMM);
 initiating processor operations in the system management mode (SMM);
 time-multiplexing the second memory address space with the first memory address space during operations in the system management mode (SMM); and
 directing subsequent memory accesses within the system management mode (SMM) memory range to the second memory address space so that the first memory address space and the second memory address space overlap.

17. A method according to claim 16 wherein the step of time-multiplexing the second memory address space with the first memory address space further comprises the steps of:
 latching the first memory address emitted from the processor after initiation of the system management mode (SMM); and
 designating the first memory address emitted from the processor as the top system management mode (SMM) address of a memory block extending into a system management mode (SMM) memory range.

18. A method according to claim 16 further comprising the steps of:
 receiving a signal designating a request to terminate operations of the processor in the system management mode (SMM); and
 restoring an operating memory configuration to direct memory accesses to the first memory address space.

19. A method according to claim 16 wherein the step of directing subsequent memory accesses within the system management mode (SMM) memory range to the second memory address space directs the memory accesses regardless of whether other memory-mapped resources reside within the same range of addresses as the system management mode (SMM) memory range.

20. A method according to claim 16 wherein the system management mode (SMM) memory range is allocated to the upper memory block addresses of a DOS memory configuration.

21. A method according to claim 16 wherein the second memory address space is configured in a system dynamic random access memory (DRAM).

22. A computer program product comprising:
a computer usable medium having computable readable code embodied therein implementing a method according to claim 16.

23. A computer system comprising:
a processor;
a memory coupled to the processor, the memory supplying data and executable program code including a computable readable code embodied therein implementing a method according to claim 16.

24. An apparatus for multiplexing a memory address space in a computer system including a processor, the apparatus comprising:
a memory including a first memory address space and a second memory address space;
an interface coupled to the memory for accessing the first memory address space when the processor is operating in a normal mode and for accessing the second memory address space including a special mode memory range when the processor is operating in a special mode;
a request line coupled to the interface, the request line designating a signal requesting operation of the processor in the special mode;
a logic for time-multiplexing the second memory address space with the first memory address space during operations in the special mode and directing subsequent memory accesses within the special mode memory range to the second memory address space so that the first memory address space and the second memory address space overlap.

25. An apparatus according to claim 24 wherein the second memory address space is configured in a system dynamic random access memory (DRAM).

26. An apparatus according to claim 24 wherein the time-multiplexing logic further comprises:
a latch for latching the first memory address emitted from the processor after initiation of the special mode; and
a logic designating the first memory address emitted from the processor as the top special mode address of a memory block extending into the special mode memory range.

27. A computer system comprising:
a processor;
a memory coupled to the processor including a first memory address space and a second memory address space;
an interface coupled to the memory for accessing the first memory address space when the processor is operating in a normal mode and for accessing the second memory address space including a special mode memory range when the processor is operating in a special mode;
a request line coupled to the interface, the request line designating a signal requesting operation of the processor in the special mode;
a logic for time-multiplexing the second memory address space with the first memory address space during operations in the special mode and directing subsequent memory accesses within the special mode memory range to the second memory address space so that the first memory address space and the second memory address space overlap.

28. A processor according to claim 27 wherein the second memory address space is configured in a system dynamic random access memory (DRAM).

29. A processor according to claim 27 wherein the time-multiplexing logic further comprises:
a latch for latching the first memory address emitted from the processor after initiation of the special mode; and
a logic designating the first memory address emitted from the processor as the top special mode address of a memory block extending into the special mode memory range.

* * * * *